US012342069B1

(12) United States Patent
Alves

(10) Patent No.: US 12,342,069 B1
(45) Date of Patent: Jun. 24, 2025

(54) CITIZEN INTERFACE FOR CONTROL OF BODY WORN CAMERAS

(71) Applicant: ALVES TECHNICAL INNOVATIONS LLC, Mill Valley, CA (US)

(72) Inventor: Ramona E. Alves, Mill Valley, CA (US)

(73) Assignee: ALVES TECHNICAL INNOVATIONS LLC, Mill Valley, CA (US)

( * ) Notice: Subject to any disclaimer, the term of this patent is extended or adjusted under 35 U.S.C. 154(b) by 157 days.

(21) Appl. No.: 18/295,292

(22) Filed: Apr. 4, 2023

Related U.S. Application Data

(60) Provisional application No. 63/327,155, filed on Apr. 4, 2022.

(51) Int. Cl.
*H04N 23/661* (2023.01)
*H04N 5/77* (2006.01)
*H04W 4/02* (2018.01)

(52) U.S. Cl.
CPC ............. *H04N 23/661* (2023.01); *H04N 5/77* (2013.01); *H04W 4/023* (2013.01)

(58) Field of Classification Search
CPC ........ H04N 23/661; H04N 5/77; H04W 4/023

USPC ..................................................... 348/211.4
See application file for complete search history.

(56) References Cited

U.S. PATENT DOCUMENTS

| 10,003,960 | B2 | 6/2018 | Alvez |
| 10,872,636 | B2 | 12/2020 | Smith et al. |
| 10,885,937 | B2 | 1/2021 | Ross et al. |
| 10,901,754 | B2 | 1/2021 | Wagner et al. |
| 10,911,725 | B2 | 2/2021 | Ross |
| 10,917,614 | B2 | 2/2021 | Haler et al. |
| 11,240,410 | B1 | 2/2022 | Alves |
| 2009/0273682 | A1 | 11/2009 | Shekarri et al. |
| 2018/0368198 | A1* | 12/2018 | Boushley .............. H04W 4/023 |

* cited by examiner

*Primary Examiner* — Joel W Fosselman
(74) *Attorney, Agent, or Firm* — Kintner IP, LLC; Mary Frances Ludwig

(57) ABSTRACT

A citizen interface for a body worn camera system, such as those worn by police, allows citizens to communicate with the camera system. A software application installed on a citizen's mobile device identifies nearby body worn cameras, and may be used in traffic stops or other citizen interactions the camera wearer. The camera system triggers actions to improve transparency and accountability, such as initiating video recording, recording an event of interest, restricting pausing, or communicating with the citizen. In embodiments, the interface may facilitate direct communication between an officer and a citizen, improving safety for both users.

13 Claims, 4 Drawing Sheets

CITIZEN INTERFACE FOR CONTROL OF BODY WORN CAMERAS

CROSS REFERENCE TO RELATED APPLICATION

This application claims the benefit of U.S. Provisional Application No. 63/327,155, filed Apr. 4, 2022, which is hereby incorporated in its entirety.

TECHNICAL FIELD

The present invention pertains generally to video recording systems, and more particularly to a citizen interface for body worn camera systems such as those used by a police department.

BACKGROUND OF THE INVENTION

Programs directed at increasing oversight and accountability of police officers often include a requirement that an officer have a body worn camera, at least in certain circumstances. However, such programs may be inconsistently used within police departments, and specific requirements often differ across various state and regional departments. These inconsistencies make evaluating the efficacy of body worn camera requirements difficult.

In some body worn camera systems video recording is started, stopped, or paused by the officer wearing the camera. These systems may not be recording in all circumstances where oversight is desired, as an officer may be preoccupied and forget or neglect to turn on the camera. In some systems a body worn camera may receive inputs which start recording, such as a detected noise. These systems are still susceptible to not recording events, such as when an input is not received, or to being turned off by the wearer.

In addition, there is a need to increase public trust surrounding encounters with law enforcement. For example, traffic stops are commonly seen by citizens as highly dangerous situations—a condition which may promote fear and negative outcomes for both parties involved.

There is therefore a need in the art for law enforcement accountability measures to be more visible to citizens. In addition, there is a need for increased safety and security in interactions between officers and citizens.

BRIEF SUMMARY OF THE EMBODIMENTS

Embodiments disclosed herein are directed to a citizen interface for body worn cameras, such as those worn by police, and methods of use with video recording systems. The interface may be, for example, a software application installed on a mobile device such as a cell phone, tablet, or the like. The interface may be configured to communicate with the a controller of a camera system, which may, in response to the communication, trigger actions related to a specific body worn camera. Actions triggered may include, among others, initiating video recording, recording an indicator of an event of interest, restricting pausing of the video recording, and/or communicating data to a system controller. In embodiments, the interface may facilitate direct communication between an officer and a citizen, increasing transparency and safety for both users.

According to one or more embodiments a method of initiating video recording of a body worn camera in cooperation with a radio network, includes: providing a body worn camera in communication with the radio network; transmitting a first trigger signal, via the radio network, to a first mobile device; initiating communication between the first mobile device and the body worn camera, by the first mobile device when the first trigger signal is received; transmitting a location request from a second mobile device, via the radio network; in response to the location request, identifying that the first mobile device is located within a predetermined range of the second mobile device; and initiating video recording of the body worn camera, in response to identifying that the first mobile device is located within the predetermined range of the second mobile device.

According to one or more embodiments the method further includes: activating a recording management application installed on the first mobile device when the first trigger signal is received.

According to one or more embodiments a method, the recording management application is configured to restrict pausing of the video recording upon detection of an event of interest.

According to one or more embodiments the method further includes: recording an indicator of an event of interest in response to identifying that the first mobile device is located within the predetermined range of the second mobile device.

According to one or more embodiments the method further includes: communicating the indicator of an event of interest to a controller in communication with the first mobile device.

According to one or more embodiments the method further includes: restricting pausing of the video recording in response to identifying that the first mobile device is located within the predetermined range of the second mobile device.

According to one or more embodiments, the first mobile device has no administrative control over the recording management application.

According to one or more embodiments a method of initiating communication between mobile devices in cooperation with a radio network includes: providing a body worn camera in communication with the radio network; initiating communication between a first mobile device and the body worn camera; providing a controller in communication with the first mobile device; activating a recording management application installed on the mobile device, wherein the controller has administrative control over the recording management application; transmitting a location request from a second mobile device, via the radio network; in response to the location request, identifying that the first mobile device is located within a predetermined range of the second mobile device; initiating communication, via the recording management application, between the first mobile device and the second mobile device, in response to identifying that the first mobile device is located within the predetermined range of the second mobile device; and initiating video recording of the body worn camera, in response to identifying that the first mobile device is located within the predetermined range of the second mobile device.

According to one or more embodiments, communication between the first mobile device and the second mobile device includes transferring at least one of a text message, a photograph, and a video.

According to one or more embodiments, the recording management application is configured to restrict pausing of the video recording upon detection of an event of interest.

According to one or more embodiments the method further includes: recording an indicator of an event of interest in response to identifying that the first mobile device is located within the predetermined range of the second mobile device.

According to one or more embodiments the method further includes: restricting pausing of the video recording in response to identifying that the first mobile device is located within the predetermined range of the second mobile device.

According to one or more embodiments a computer program product, including a non-transitory computer-readable storage medium includes program instructions embodied therewith, the program instructions, when executed by a processor cause the processor to: transmit a location request, via a radio network, the location request associated with a predetermined range; receive an identification of a mobile device located within the predetermined range, wherein the mobile device is in communication with the radio network and a body worn camera; initiating a request to communicate with the mobile device; provide for display of at least one of a text message, a photograph, and a video; and transmit a signal to the body worn camera, the signal operable to initiate video recording.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the citizen interface for body worn cameras are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

Figure 1:
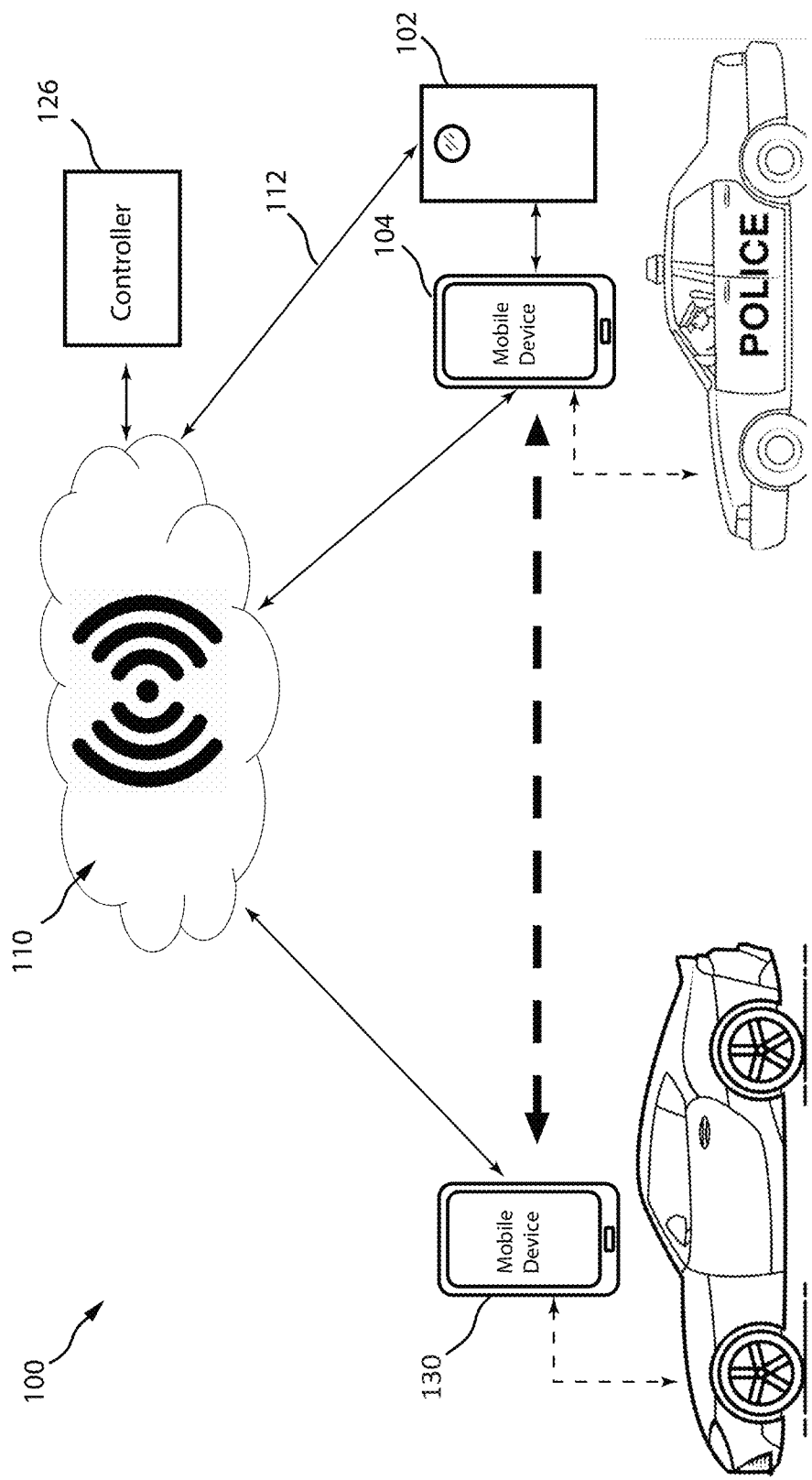
FIG. 1 is an example schematic diagram of an embodiment of a video recording system.

FIG. 1 is an example schematic diagram of an embodiment of a video recording system 100. System 100 may include one or more body worn cameras 102, such as those worn by police. Elements of system 100 may be in communication via a radio network 110, which may be an asymmetrically encrypted radio network—for example, a radio network operating on either the Project 25 (P25) or the Terrestrial Trunked Radio (TETRA) protocols. System 100 may include one or more controllers 126 and one or more controlled devices, such as mobile devices (e.g., cell phones or tablets, such as a first mobile device 104 that may be associated with an officer), body worn cameras 102, holster sensors, shot detectors, and other devices that warrant monitoring and control. Controller 126 may be any device capable of storing, processing, and communicating information in accordance with embodiments of the system described herein. For example, the controller may be a personal computer, a server, or a mobile device, among other devices. Controller 126 may communicate with controlled devices (e.g., first mobile device 104) or other devices in the system through radio network 110, a wired or wireless LAN connection, a cellular network, or similar connection.

As used in this application, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

A second mobile device 130 may be associated with a citizen and may be in communication with radio network 110. Second mobile device 130 may include an installed software application (also referred to as the "citizen application", or "app") which may facilitate communication with elements of system 100, such as first mobile device 104 or controller 126. The citizen application may be made available to the general public; for example, mobile device users in and around a jurisdiction that has implemented a video recording system for control of body worn cameras may have access to a citizen application connected to the specific jurisdiction (or more than one jurisdiction).

In an example use scenario, a user of second mobile device 130 (e.g., a citizen) activates the citizen application installed on second mobile device 130. Activating the app may cause second mobile device 130 to automatically transmit a location request, for example, via radio network 110. In response to the location request, system 100 may locate and identify any nearby body worn camera (such as body worn camera, or BWC, 102). The location process may include, for example, triangulating radio signals in proximity of the user (e.g., within a predetermined range, R, of second mobile device 130). In response to identifying a nearby body worn camera, the system may take certain actions relative to any body worn camera identified as being near the user of the app. For example, the system may initiate video recording of the BWC. In some cases, BWCs of the system may already be recording (e.g., in a system where the BWC defaults to always record). In such a case initiating video recording may include verification that recording is in progress, restricting pausing of the video recording, or unpausing a recording that is in a paused state.

In some cases, a recording management application (RMA) may be installed on first mobile device 104. The RMA may facilitate communication between first mobile device 104 and body worn camera 102, controller 126, or other elements of system 100. In an exemplary use case, BWC 102 may transmit a signal via the radio network (e.g., a low frequency radio signal) when BWC 102 is initialized. In response, the system may transmit a first trigger signal 112 to first mobile device 104. When first trigger signal 112 is received, communication may be initiated between first mobile device 104 and BWC 102 (e.g., the RMA may be activated and may initiate or verify a communication link).

This process may be used to link a specific BWC to a mobile device associated with a specific officer.

In an example use case, the RMA, controller 126, or another device of system 100 may initiate communication between first mobile device 104 and second mobile device 130. Having direct communication between an officer and a citizen may be particularly useful in some situations, such as a traffic stop. For example, if a citizen using second mobile device 130 is pulled over while driving, they can engage the app on second mobile device 130. System 100 may identify first mobile device 104 (e.g., first mobile device 104 associated with the officer conducting the traffic stop) as it is located within the predetermined range R of second mobile device 130. Once the system has identified first mobile device 104 and second mobile device 130 as being within range of one another, the app may facilitate a text conversation, or other method of communication, between the officer and the citizen. The citizen and officer may be able to transfer any or all of text messages (e.g., SMS), audio, photographs, and videos through the citizen app and the RMA. This feature may allow non-contact transfer of information prior to, or without, the officer exiting their cruiser. Examples of information that may be transferred include: a photograph of the citizen's driver's license, insurance card, or registration card; a photograph of the officer or their identification; and the like—which may promote safety of both the officer and the citizen.

Figure 2:
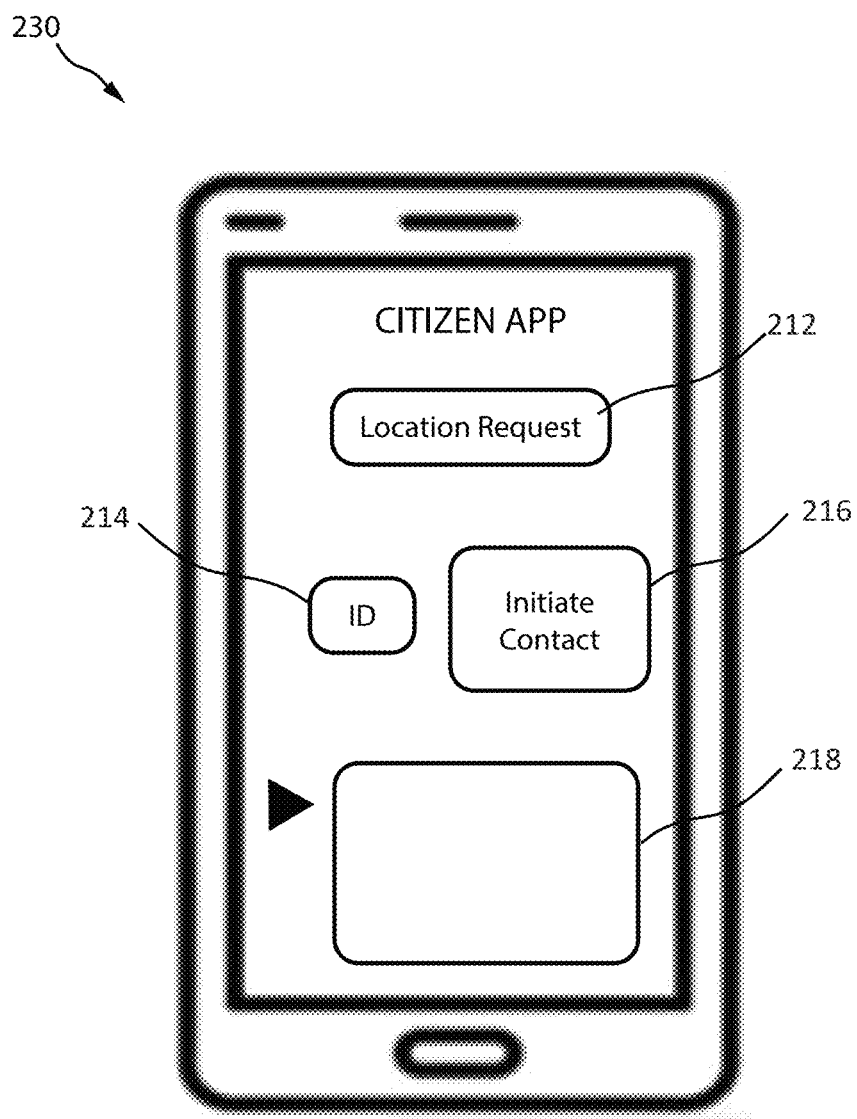
FIG. 2 is an example illustration of an embodiment of a user interface.

FIG. 2 is an example illustration of an embodiment of a user interface (e.g., a graphical user interface or GUI) of the citizen application installed on a second mobile device 230 (e.g., a mobile device associated with a citizen). Engaging the app may initiate a location request, or a request may be manually initiated, such as by activating location request button 212. The app may display an identification (ID) indicator 214 for one or more officers in range. The citizen may initiate contact with the officer, such as by activating initiate contact button 216. In some cases contact may be automatically initiated or may be initiated by the officer—in which case the user may accept a request for contact via a similar button. A chat window 218, or similar may be used for sending and receiving information between second mobile device 230 and the officer's mobile device.

Additional information may be displayed in the GUI, such as communication status indicators, user ID, camera ID, date and time, range settings, or the like. Any of the GUI elements discussed with regard to second mobile device 230 may also, or instead, be displayed on a first mobile device 104, such as in the RMA installed thereon.

Referring again to FIG. 1, a specific BWC 102 may be associated with a specific mobile device (e.g., first mobile device 104). For example, controller 126 may store a camera ID and a mobile device ID which may be associated with one another. In some embodiments, a user profile may be associated with a specific camera ID or mobile device ID. In other embodiments, other supporting devices such as a camera housing may be associated with a specific BWC; a paired BWC and housing may be associated with a mobile device; a paired housing and mobile device may be associated with a BWC; and other configurations may be readily envisioned to achieve an equivalent result.

While BWC 102 may default to always recording, system settings may permit a user to pause recording throughout their shift. Pauses in recording may be activated by the user though the recording management application on first mobile device 104. The recording management application may be further configured to restrict pausing of the video recording upon detection of an event of interest. In certain configurations, system 100 may record an indicator of an event of interest (such as a timestamp or an event code) in response to identifying that first mobile device 104 is located within predetermined range R of second mobile device 130. Such an indicator may cause the RMA to restrict pausing of video recording. The indicator may be communicated to controller 126 which communicates with first mobile device 104. Other events of interest may be triggered by detecting audible sirens or gunshots, sensing removal of a gun from a holster, the BWC entering certain locations, and so on.

System 100 may be administered and configured by a manager permitted to access controller 126. The manager may oversee operations such as installing the recording management application on officer's mobile devices, distributing the citizen application, managing a database of information associated with users of the citizen application, monitoring associations of hardware components, configuring detection of events of interest, setting user permissions for recording pause functions, configuring shift reports, and similar administrative functions. The manager may be, for example, a dispatch unit, a supervisor, a human resources department, a central control group, or a governing office. The manager may follow standard operating procedures or general best practices set forth for body worn camera systems. In embodiments, the officer's mobile device has no administration control over the recording management application installed thereon. The mobile device cannot disable or modify the application. The application will only accept inputs configured or approved by the system manager.

In some cases, when a location request is received through the app, more than one nearby BWC may be detected, and more than one of these BWCs may be activated. If no nearby BWC is detected, the system may notify the user of this condition.

Other features of the system may be similar to those described in U.S. Pat. No. 11,240,410, issued on Feb. 1, 2022, which is incorporated by reference as if fully recited herein.

In another example use case, an officer may make a pedestrian stop of a citizen who has the citizen app installed on their mobile device. The citizen may engage the app, which may then triangulate the radio signals to locate the controlling officer's BWC. The system may record an indicator of an event of interest. The event and corresponding video may later be reviewed by a controller of the system, the officer's supervisor, or another oversight entity.

Figure 3:
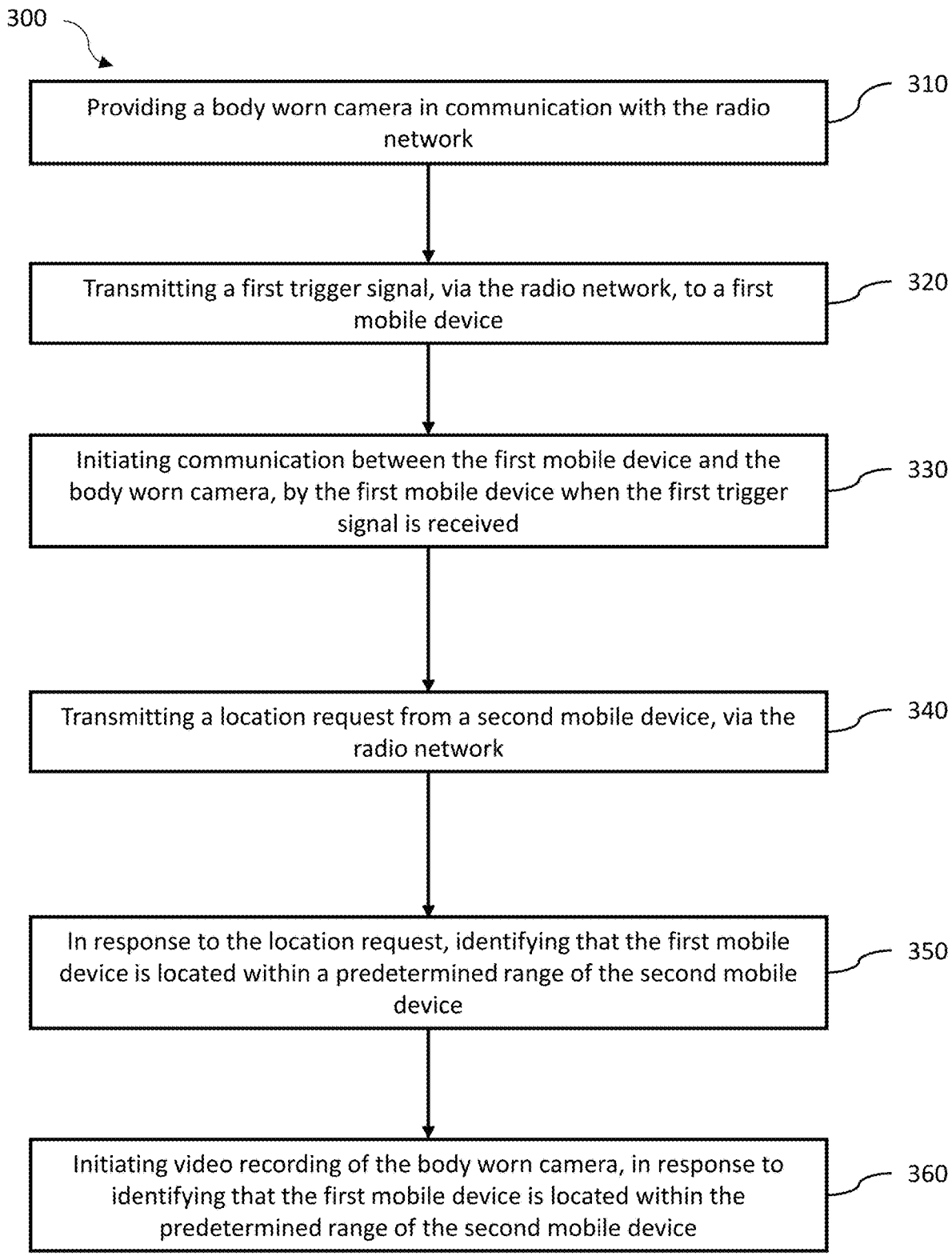
FIG. 3 is an example flow-chart of an embodiment of a method of initiating video recording of a body worn camera.

FIG. 3 is an example flow-chart of an embodiment of a method of initiating video recording of a body worn camera. In terms of use, method 300 of initiating video recording of a body worn camera in cooperation with a radio network includes: (refer to FIGS. 1-4)

(a) providing 310 a body worn camera 102 in communication with the radio network 110;

(b) transmitting 320 a first trigger signal 112, via the radio network, to a first mobile device 104;

(c) initiating 330 communication between the first mobile device and the body worn camera, by the first mobile device when the first trigger signal is received;

(d) transmitting 340 a location request from a second mobile device 130, via the radio network;

(e) in response to the location request, identifying 350 that the first mobile device is located within a predetermined range R of the second mobile device; and (f) initiating 360 video recording of the body worn camera, in response to identifying that the first mobile device is located within the predetermined range of the second mobile device.

The method may further include activating a recording management application installed on the first mobile device when the first trigger signal is received.

Any of the preceding methods may further include, recording an indicator of an event of interest in response to identifying that the first mobile device is located within the predetermined range of the second mobile device.

Any of the preceding methods may further include, restricting pausing of the video recording in response to identifying that the first mobile device is located within the predetermined range of the second mobile device.

Figure 4:
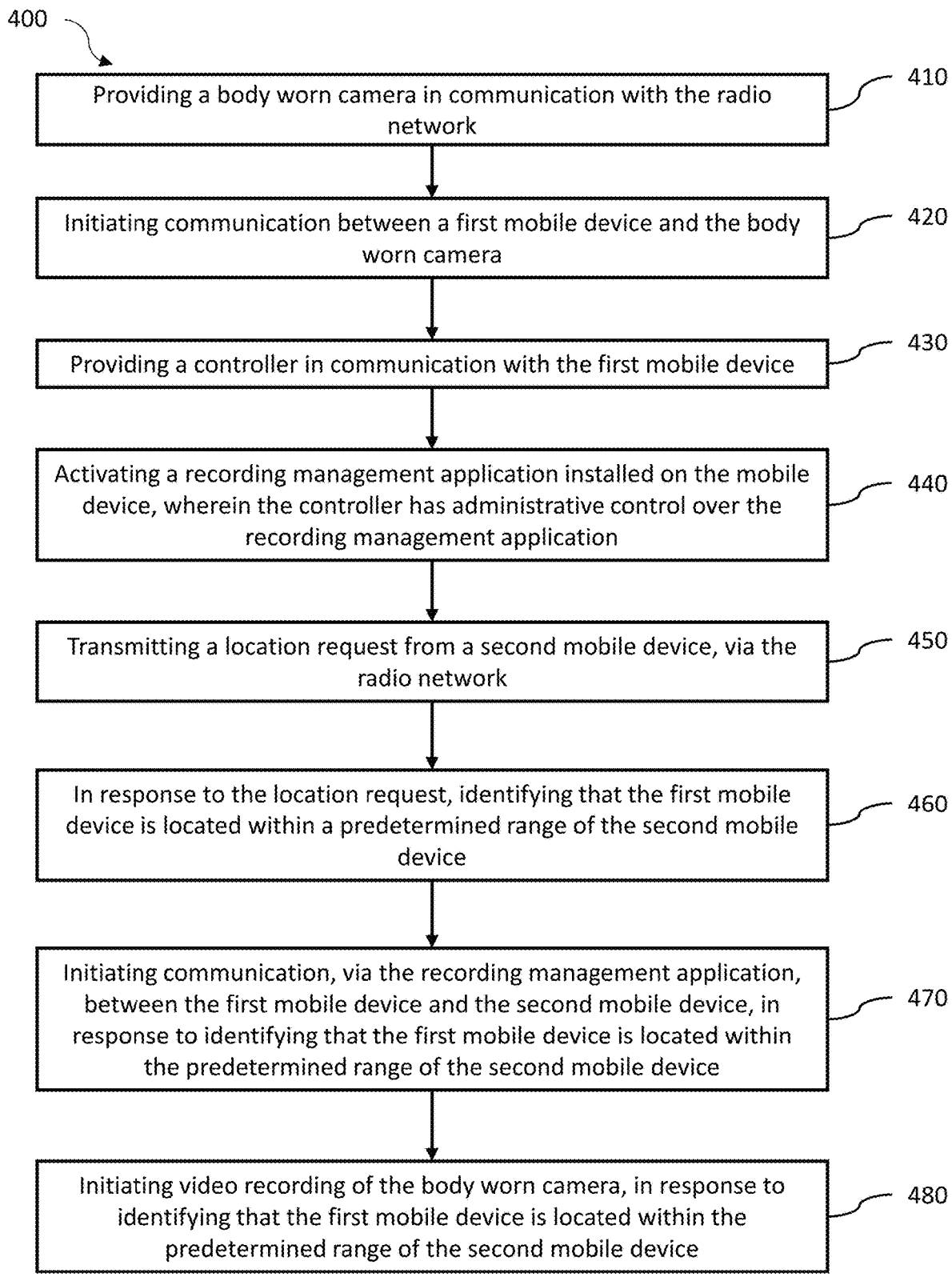
FIG. 4 is an example flow-chart of an embodiment of a method of initiating communication between mobile devices.

FIG. 4 is an example flow-chart of an embodiment of a method 400 of initiating communication between mobile devices. In terms of use, method 400 of initiating communication between mobile devices in cooperation with a radio network includes: (refer to FIGS. 1-4)

(a) providing 410 a body worn camera 102 in communication with the radio network 110;
(b) initiating 420 communication between a first mobile device 104 and the body worn camera 102;
(c) providing 430 a controller 126 in communication with the first mobile device;
(d) activating 440 a recording management application installed on the mobile device, wherein the controller has administrative control over the recording management application;
(e) transmitting 450 a location request from a second mobile device 130, via the radio network;
(f) in response to the location request, identifying 460 that the first mobile device is located within a predetermined range R of the second mobile device;
(g) initiating 470 communication, via the recording management application, between the first mobile device and the second mobile device, in response to identifying that the first mobile device is located within the predetermined range of the second mobile device; and
(h) initiating 480 video recording of the body worn camera, in response to identifying that the first mobile device is located within the predetermined range of the second mobile device.

The method may further include transferring at least one of a text message, a photograph, and a video between the first mobile device and the second mobile device.

The method may further include one or more steps or aspects of any of the preceding methods.

Further provided is a computer program product, comprising a non-transitory computer-readable storage medium including program instructions embodied therewith, the program instructions, when executed by a processor cause the processor to:

transmit a location request, via a radio network, the location request associated with a predetermined range;
receive an identification of a mobile device located within the predetermined range, wherein the mobile device is in communication with the radio network and a body worn camera;
initiating a request to communicate with the mobile device;
provide for display of at least one of a text message, a photograph, and a video; and
transmit a signal to the body worn camera, the signal operable to initiate video recording.

While examples discussed herein are particularly relevant to law enforcement scenarios, a skilled artisan will recognize that the citizen interface and methods of use may be applied to video recording systems in a variety of use cases. For example, service personnel, delivery personnel, caretakers, and so on may use body worn camera systems to which embodiments disclosed herein may be applied to bring oversight and transparency for users.

The embodiments of devices, systems, and methods of use described herein are exemplary and numerous modifications, combinations, variations, and rearrangements can be readily envisioned to achieve an equivalent result, all of which are intended to be embraced within the scope of the appended claims. Further, nothing in the above-provided discussions of the devices, systems, and methods should be construed as limiting the invention to a particular embodiment or combination of embodiments. The scope of the invention is defined by the appended claims.

I claim:

1. A method of initiating video recording of a body worn camera in cooperation with a radio network, the method including:

providing a body worn camera in communication with the radio network;
transmitting a first trigger signal, via the radio network, to a first mobile device associated with a first user;
initiating communication between the first mobile device and the body worn camera, by the first mobile device when the first trigger signal is received;
activating a citizen application installed on a second mobile device associated with a second user, the citizen application configured to facilitate communication with the first mobile device;
in response to activating the citizen application, transmitting a location request from the second mobile device, via the radio network;
in response to the location request, identifying that the first mobile device associated with the first user is located within a predetermined range of the second mobile device associated with the second user; and
initiating video recording of the body worn camera, in response to identifying that the first mobile device is located within the predetermined range of the second mobile device.

2. The method of claim 1, further including: activating a recording management application installed on the first mobile device when the first trigger signal is received.

3. The method of claim 2, wherein the recording management application is configured to restrict pausing of the video recording upon detection of an event of interest.

4. The method of claim 2, wherein the first mobile device has no administrative control over the recording management application.

5. The method of claim 1, further including: recording an indicator of an event of interest in response to identifying that the first mobile device is located within the predetermined range of the second mobile device.

6. The method of claim 5, further including: communicating the indicator of an event of interest to a controller in communication with the first mobile device.

7. The method of claim 1, further including: restricting pausing of the video recording in response to identifying that the first mobile device is located within the predetermined range of the second mobile device.

8. A method of initiating communication between mobile devices in cooperation with a radio network, the method including:

providing a body worn camera in communication with the radio network;

initiating communication between a first mobile device associated with a first user and the body worn camera;

providing a controller in communication with the first mobile device;

activating a recording management application installed on the first mobile device, wherein the controller has administrative control over the recording management application;

activating a citizen application installed on a second mobile device associated with a second user, the citizen application configured to facilitate communication with the first mobile device and the controller;

in response to activating the citizen application, transmitting a location request from the second mobile device associated with the second user, via the radio network;

in response to the location request, identifying that the first mobile device associated with the first user is located within a predetermined range of the second mobile device associated with the second user;

initiating communication, via the recording management application, between the first mobile device and the second mobile device, in response to identifying that the first mobile device is located within the predetermined range of the second mobile device; and initiating video recording of the body worn camera, in response to identifying that the first mobile device is located within the predetermined range of the second mobile device.

9. The method of claim 8, wherein communication between the first mobile device and the second mobile device includes transferring at least one of a text message, a photograph, and a video.

10. The method of claim 8, wherein the recording management application is configured to restrict pausing of the video recording upon detection of an event of interest.

11. The method of claim 8, further including: recording an indicator of an event of interest in response to identifying that the first mobile device is located within the predetermined range of the second mobile device.

12. The method of claim 8, further including: restricting pausing of the video recording in response to identifying that the first mobile device is located within the predetermined range of the second mobile device.

13. A computer program product, comprising a non-transitory computer-readable storage medium including program instructions embodied therewith, the program instructions, when executed by a processor cause the processor to:

transmit a location request, via a radio network, the location request associated with a predetermined range relative to a second mobile device associated with a second user;

receive an identification of a first mobile device located within the predetermined range, the first mobile device associated with a first user, wherein the first mobile device is in communication with the radio network and a body worn camera associated with the first user;

in response to receiving the identification that the first mobile device is located within the predetermined range of the second mobile device, initiate a request for the second mobile device to communicate with the first mobile device associated with the first user;

provide for display of at least one of a text message, a photograph, and a video; and transmit a signal to the body worn camera, the signal operable to initiate video recording.

* * * * *